though

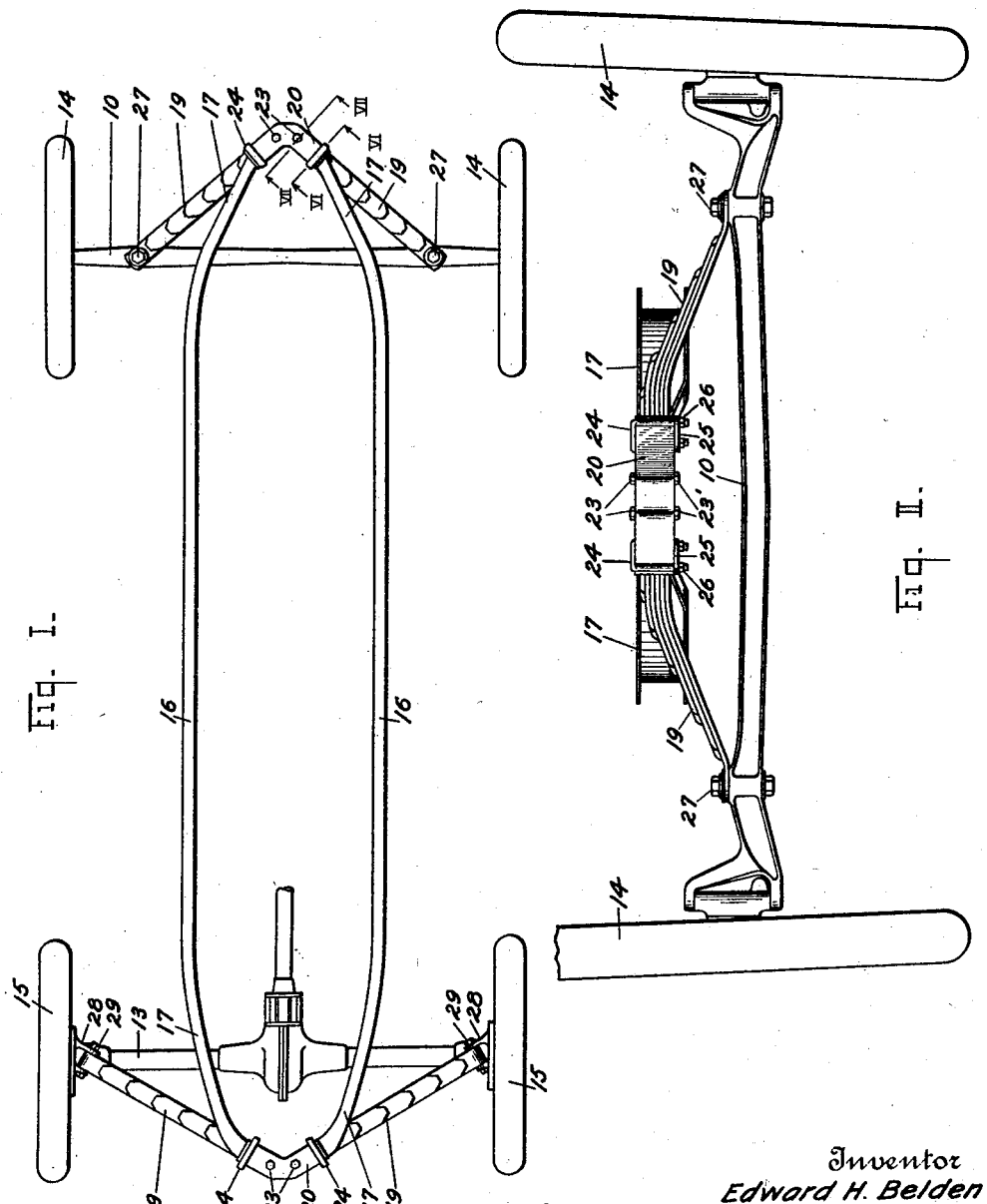

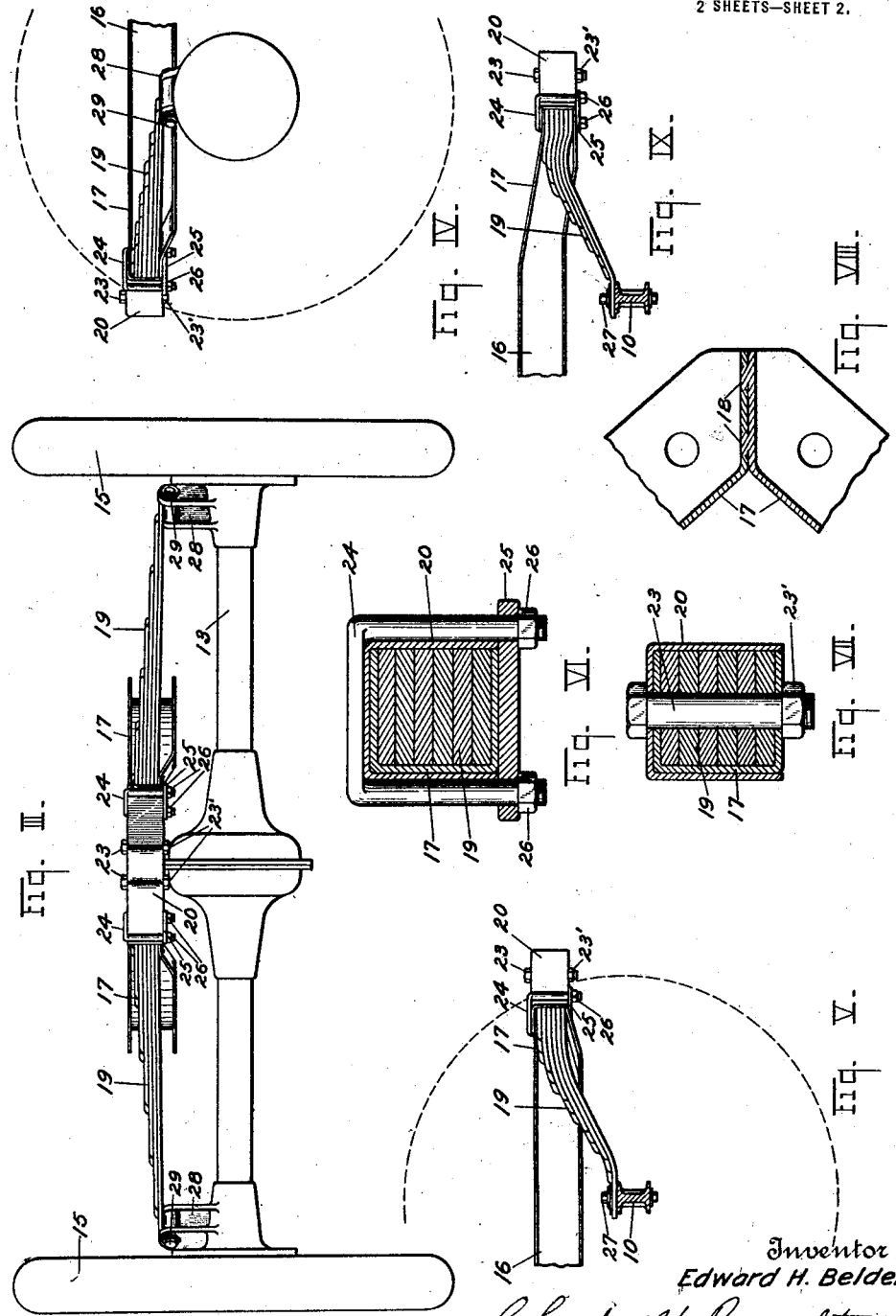

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

VEHICLE SPRING SUSPENSION.

1,407,914.  Specification of Letters Patent.  Patented Feb. 28, 1922.

Application filed June 15, 1917. Serial No. 174,934.

*To all whom it may concern:*

Be it known that I, EDWARD H. BELDEN, a citizen of the United States, residing at Toledo, in the county of Lucas and State of Ohio, have invented certain new and useful Improvements in Vehicle Spring Suspensions, of which I declare the following to be a full, clear, and exact description.

This invention relates to improvements in the chassis of motor vehicles, and particularly to improvements in the frame construction thereof, the connections between the frame and the axles, and the manner in which the frame is supported from the axles by the springs.

The principal object of this invention is to devise an improved spring suspension for motor vehicles of such a nature as to permit of the use of a shorter wheel base while giving the effect of a long wheel base and providing easy riding qualities and permitting the use of a longer and roomier body. A further object of this invention is to provide a spring suspension for motor vehicles in which the springs form the only connection between the frame and the axles and in which no radius rods are needed. Still another object of my invention is to provide an improved and simplified frame construction and connections between said frame and the axles, which will be very simple in construction, light in weight, and which can be manufactured at a very low cost.

Other objects, and objects relating to details of construction and economies of manufacture, will definitely appear from the detailed description to follow.

I accomplish the objects of my invention in one instance by the devices and means described in the following specification, but it is evident that the same may be varied widely without departing from the scope of the invention as pointed out in the appended claims.

A construction constituting a preferred embodiment of my invention is illustrated in the accompanying drawings, forming a part of this specification, in which—

Figure I is a top plan view of a construction embodying my invention;

Figure II is a view in front elevation;

Figure III is a view in rear elevation;

Figure IV is a fragmentary view in side elevation, showing the rear spring construction and its connection with the rear end of the frame and the rear axle;

Figure V is a fragmentary view in side elevation showing the front spring construction and its connection with the front end of the frame and the front axle;

Figure VI is an enlarged, detail, sectional view, taken substantially on the line VI—VI of Figure I;

Figure VII is an enlarged, detail, sectional view, taken substantially on the line VII—VII of Figure I;

Figure VIII is an enlarged, detail, fragmentary, sectional view, showing the connections between the ends of the frame members; and Figure IX is a view in side elevation, similar to Figure V but showing a slightly modified form of my invention.

In the drawings, similar reference numerals refer to similar parts throughout the several views, and the sectional views are taken looking in the direction of the arrows at the ends of the section lines.

Considering the numbered parts of the drawings, it will be seen that the frame comprises a pair of channel bar members 16, the end portions 17 of which are bent inwardly towards each other, so that the extreme end portions thereof engage and may be spot-welded together, as at 18, in order to facilitate the assembly of the frame and spring members. The front axle 10 carries the usual front wheels 14, and the rear axle 13 carries the usual rear driving wheels 15, and the only connections between said axles and the frames are preferably the cantilever springs 19, at front and rear, through which the frame is suspended from the axle. Said springs 19 are disposed at angles to the axle and converge towards each other from their connection with the axles, said springs being connected to the extreme end portions of the frame. The inner ends of said cantilever springs lie in the channels of the end portions 17 of the frame member at the ends thereof and a channel shaped yoke 20 is disposed over the connected end portions 17 of the frame members, embracing said end portions 17 and holding the ends of the springs 19 in position in the channels of the frame members, as clearly appears from Figures VI and VII. Bolts 23 extend through the channel shaped yoke 20, the frame member 17, and spring 19, and are held in place by the nuts 23' threaded thereon. The yoke member 20 and the springs 19 are also held in place by the shackle bolts 24, each of which surrounds yoke 20 and has its ends passing through strap 25 below the frame member and the lower edges of the yoke 20, said shackle bolts being held in place by means of the nuts 26 on the ends thereof.

It will be seen that, in this manner, the inner ends of the springs are rigidly connected to the ends of the frame sections so that they cannot twist or turn or work loose therefrom. Furthermore, the yoke member 20 serves as a positive rigid connection between the ends of the frame members. The frame members 17, as has already been pointed out, are spot-welded together at 18, but this is merely for convenience in assembly, and I do not propose to rely upon this as a permanent connection for the ends of the frame members, although it reinforces the connection provided by the yoke 20 described above.

The ends of the front springs are connected to the front axle by means of the bolts 27 passing through the ends of said springs and through the front axle, as clearly shown in Figure V. Yokes 28 are formed on the rear axle casing, as shown in Figure III, and the ends of the springs 19 are secured to pins or bolts 29, carried by said yokes, so that the ends of said springs 19 are secured in place in said yokes on the rear axle casing.

In Figure IX, I have shown a slightly modified form of my invention in which the forward ends of the frame members have a slight drop so as to enable the suspension of the frame at a slightly greater distance above the axle and also to provide for a somewhat different curvature of the spring 19, which is desirable from some standpoints. The connections between the frame and the ends of the springs 19 and between the springs and the axles are unchanged however.

It will be seen that the frame is comprised of the two channel bars 16 the ends of which are bent towards each other and secured together so that an oval frame is formed, as clearly appears from Figure I. The assemblage of the frame is thus very much simplified, the ends of the two channel bars being merely spot-welded together, and the permanent connections between the ends of said channel bars being formed by the connections for securing the springs 19 in place.

The ends of the frame extend a considerable distance beyond the axles and the springs 19 have their ends connected to the axles and converge therefrom to the points of connection with the ends of the frame, to which they are rigidly connected by means of the yoke 20, the bolts 23 and the shackle bolts 24, as clearly indicated in Figures VI and VII. It will be apparent that the points at which the frame is suspended by the springs are further apart than the axles so that all the advantages of a long wheel base are had without the employment of an actual long wheel base. That is to say, by the employment of my improved spring suspension, the axles may be located closer together and the wheel base will thus be shorter, while, since the points of suspension of the frame are further separated than the axles, this suspension gives all the advantages of a longer wheel base, including the easier riding qualities, and the possibility of using a larger and roomier body.

It will further be apparent that, by the use of this method of spring suspension, there is no necessity for using radius rods connecting the rear axle to the frame, since the springs 19 form a connection between the frame and the rear axle which prevents the twisting or turning of the rear axle casing relative to the frame and also transmits the driving or tractive force from the rear wheels and the rear axle casing to the frame. By using my improved spring suspension, the construction of the motor vehicle frame and running gear is therefore greatly simplified, the weight is greatly reduced, and the manufacturing cost is correspondingly lessened without sacrificing strength or easy riding qualities.

I have found that this particular embodiment of my invention is very desirable from many standpoints, but I am also aware that it may be varied considerably without departing from the spirit of my invention, and, therefore, claim my invention broadly and specifically, as indicated by the appended claims.

Having thus described my invention, what I claim as new and desire to secure by Letters Patent is:

1. In a vehicle, the combination of a frame comprising a pair of channel bars having their ends bent towards each other and spot-welded together; front and rear axles; a pair of cantilever springs, rigidly connected at their rear ends to said front axle adjacent the ends thereof, and converging forwardly to their connection with the front end of the frame; a second pair of cantilever springs connected at their forward ends to said rear axle and converging rearwardly to their connection with the rear end of said frame, the adjacent ends of each pair of springs being confined in the channel bars; and channel shaped yokes secured over the connected ends of said bars and rigidly connecting the adjacent ends of said channel bars and said springs.

2. In a vehicle, the combination of a frame comprising a pair of channel bars, having their ends bent towards each other and connected together; front and rear axles; a pair of cantilever springs connected at their rear ends to said front axle, adjacent the ends thereof and converging forwardly to their connection with the front end of said frame; a second pair of cantilever springs, connected at their forward ends to said rear axle, adjacent the ends thereof, and converging rearwardly to their connection with the rear end of said frame, the adjacent ends of each pair of springs being confined in the channel bars adjacent the ends thereof; and yokes secured over the connected ends of said channel bars and rigidly connecting the adjacent ends of said channel bars and said springs.

3. In a vehicle, the combination of a frame, comprising a pair of channel bars having their ends bent towards each other and connected together; front and rear axles; a pair of cantilever springs connected at their rear ends to said front axle, adjacent the ends thereof and converging forwardly to their connection with the front end of said frame; a second pair of cantilever springs connected at their forward ends to said rear axle, and converging rearwardly to their connection with the rear end of said frame, the adjacent ends of each pair of springs being confined in the channel bars, adjacent the ends thereof; and yokes rigidly connecting the adjacent ends of said channel bars and said springs.

4. In a vehicle, the combination of a frame, comprising a pair of channel bars having their ends bent towards each other and connected together; front and rear axles; a pair of cantilever springs connected at their rear ends to said front axle, and converging forwardly to their connection with the front end of said frame; means for rigidly connecting together the adjacent forward ends of said springs and the adjacent ends of said channel bars; a pair of cantilever springs connected at their forward ends to said rear axle and converging rearwardly to their connection with the rear end of said frame; and means rigidly connecting together the rear ends of said springs and said channel bars.

5. In a vehicle, the combination of a frame; front and rear axles; a pair of cantilever springs connected at their rear ends to said front axle and converging forwardly to their connection with the front end of said frame; means for rigidly connecting the forward ends of said springs to said frame; a second pair of cantilever springs, connected at their forward ends to said rear axle and converging rearwardly to their connection with the rear end of said frame; and means for rigidly connecting the rear ends of said spring to said frame.

6. In a vehicle, the combination of an oblong frame; front and rear axles; a pair of cantilever springs, connected at their rear ends to said front axle and converging forwardly and upwardly to the end of said oblong frame; means connecting the forward ends of said springs to the forward end of said frame; a second pair of cantilever springs, connected at their forward ends to said rear axle and converging rearwardly to the end of said oblong frame; and means for connecting the rear ends of said springs to the rear end of said frame.

7. In a vehicle, the combination of a frame; front and rear axles; a pair of cantilever springs, connected at their rear ends to said front axle and extending forwardly to their connection with the front end of said frame centrally thereof; means for connecting the forward ends of said springs with said frame; a second pair of cantilever springs, connected at their forward ends to said rear axle and extending rearwardly to their connection with the rear end of said frame; and means for connecting the rear ends of said springs to the rear end of said frame.

8. In a vehicle, the combination of a frame; an extension for said frame; an axle; a pair of cantilever springs, connected at one end to said axle, and extending upwardly and converging longitudinally of the vehicle from said axle to their connection with said frame extension; and means for rigidly connecting the other ends of said springs with said frame.

9. In a vehicle, the combination of a frame, comprising a pair of channel bars, having their ends bent towards each other and spot-welded together; an axle; a pair of cantilever springs, connected at one end to said axle and extending from said axle to their connection with one end of said frame; and means rigidly connecting the ends of said channel bars together and with said springs.

10. In a vehicle, the combination of a frame comprising a pair of channel bars having their ends bent toward each other, and a yoke rigidly connecting the adjacent ends of said channel bars, front and rear axles, a pair of cantilever springs connected at their rear ends to said front axle adjacent the ends thereof and converging forwardly to the front end of said frame, a second pair of cantilever springs connected at their forward ends to said rear axle and converging rearwardly to their connection with the rear end of said frame, and means for connecting each pair of springs to said frame.

11. In a vehicle, the combination of a frame, front and rear axles, a pair of springs connected at one end to said front axle and converging forwardly to said frame, means for connecting said springs to said frame, a second pair of springs connected to the rear axle and converging rearwardly to said frame, and means for connecting said last mentioned springs to said frame.

12. In a vehicle, the combination of a frame, front and rear axles, a pair of cantilever springs connected at their rear ends to said front axle and extending forwardly to a position centrally of the front end of said frame, means for connecting the forward ends of said springs with said frame, a second pair of cantilever springs connected at their forward ends to the rear axle and extending rearwardly to a point centrally of the rear end of said frame, and means for connecting the rear ends of said springs to the rear end of said frame.

13. In a vehicle having in combination a frame, a front axle and a driving rear axle, a pair of springs connected at one end to said front axle and converging forwardly between said axle and said frame, means for connecting said springs to said frame, a second pair of springs connected to said rear driving axle and converging rearwardly between said axle and said frame, and means for connecting said last mentioned springs to said frame.

14. In a vehicle, the combination of a frame, a front and a rear axle and cantilever springs secured to the ends of the frame at the central portion thereof and connected to the axles at their opposite ends, the distance between said axles being less than the distance between the ends of the frame.

15. In a vehicle, the combination of a frame, a front axle, a rear axle and springs each connected to an axle and to the vehicle frame centrally thereof, the distance between the ends of the springs connected to said frame being greater than the distance between the ends of the springs connected to the axles.

16. In a vehicle, having a front and a rear axle, a frame extending beyond said front and rear axles on either end of the longitudinal body portion of said frame, and a spring suspension for said frame having springs connected to said axles adjacent each extremity thereof and to the extended ends of said frame at the central portion thereof, said springs located at an angle to the longitudinal axis of said frame.

17. In a vehicle, a running gear including a front axle and a rear axle, the one independent of the other, a vehicle frame, a spring suspension between said frame and running gear including spring means connected at one point to said frame and to said running gear at one end of the vehicle, spring means connected to said frame at another point in line with said first mentioned point and connected with the running gear at the other end of the vehicle, said spring means being arranged to permit vertical movement between the frame and running gear and tend to prevent relative movement in a lateral direction therebetween, the points of connection between the spring means and the frame constituting a two-point suspension between the frame and the running gear.

18. In a vehicle, a running gear including a front axle and a rear axle, the one independent of the other, a vehicle frame, and a spring suspension between said frame and said running gear including a pair of cantilever springs connected to the frame at substantially the medial line thereof at one end, and at the other end to an axle, and a pair of cantilever springs connected at one end to the other axle, and at the other end of the springs to the frame in substantially the medial line thereof.

19. In a vehicle, having a front and rear axle, the combination therewith of a frame having a body portion and end extensions beyond said axles, a spring suspension for said frame, including springs located between said frame and axles and connected to each of said axles and to said frame adjacent the medial line, only and in said extensions.

20. In a vehicle, having a running gear including a front and rear axle, the combination therewith of a frame having a body portion and end extensions beyond said axles, a two-point spring suspension between said frame and said running gear, including outwardly extending converging springs connected to each of said axles, adjacent the ends thereof and to said frame adjacent the medial line thereof in said extensions.

21. In a vehicle having a front axle, a rear axle, and a frame having extensions beyond said axles, a spring suspension for each end of the frame including multiple leaf cantilever springs of varying leaf lengths connected at their rigid ends to said extensions adjacent the medial line thereof and at their operative ends to said axles adjacent the wheels thereof.

22. In a vehicle, having a front axle, a rear axle, a frame having a body portion and a front and rear extension beyond said front and rear axles, the combination therewith of a spring suspension for each end of said frame including a pair of springs located between said frame and one of said axles and connected to said axle and to the corresponding frame extension adjacent to the medial line of the frame, said springs being located at an angle to the longitudinal axis of the frame.

23. In a vehicle, having a front axle, a rear axle, a frame having a body portion and a front and rear extension beyond said front and rear axles, a combination therewith of a spring suspension for each end of said frame including a pair of converging springs, of the multiple leaf cantilever type having leaves of varying lengths connected to an axle at the small end of the springs and to said frame extensions adjacent to the medial line of the frame at the thick rigid ends of said springs.

24. In a vehicle, having a front axle, a rear axle and a frame, a spring suspension for each end of said frame, including converging cantilever springs connected to an axle and to the frame adjacent to the medial line thereof.

25. In a vehicle having a running gear including independent front and rear axles, a frame and a two point suspension therefor including cantilever springs connected to said axles and to said frame centrally at each end thereof each of said springs being arranged to make an acute angle with the axis of said frame.

26. In a vehicle, having a front axle, a rear axle and a frame, the combination therewith of a spring suspension for each end of the frame connected to the frame adjacent to the medial line thereof, the spring suspension including a plurality of springs connected at one end to the frame and at their other end to the axle adjacent each extremity thereof.

27. In a vehicle having an axle and a frame extending beyond said axle, a spring suspension including a spring located at an angle to the longitudinal axis of the frame, said spring extending between said axle and said frame connected to the axle adjacent a wheel thereof and to the frame extension centrally thereof, said spring being rigidly associated with the frame and pivotally connected with the axle.

28. In a vehicle having an axle and a frame having a portion extending beyond said axle, a spring suspension including a spring of the multiple leaf cantilever type connected at the rigid end thereof to the extending portion of said frame centrally thereof, the opposite end of said spring being pivotally connected to said axle.

29. In a vehicle having an axle, a frame and an extension beyond said axle, and a spring suspension therefor, including spring means having angularly disposed spring portions having multiple leaves of varying lengths connected at the thick ends of said frame extension centrally thereof and connected to said axle at the thin ends thereof adjacent each end of the axle.

30. In a vehicle, having a front axle, a rear axle, a frame having extensions beyond each of said axles, a spring suspension for each of said frame extensions including spring portions connected at one end to an axle and at the opposite end to one of said extensions adjacent the medial line of the frame.

31. In a vehicle having an axle, a frame having a portion extending beyond said axle and a spring suspension for said extending portion including a pair of springs disposed angularly with respect to each other with adjacent ends secured at a common point to said extension and with their opposite ends pivoted to the outer portions of said axle.

32. In a vehicle having independent front and rear axle units, a vehicle frame unit, and a spring suspension between the frame unit and the axle unit connected at three points only at each end of the vehicle, said suspension comprising a plurality of springs at each end of the frame unit connected at one end at substantially one point with one of said units and at two points with the other of said units.

In testimony whereof I affix my signature.

EDWARD H. BELDEN.

Certificate of Correction.

It is hereby certified that in Letters Patent No. 1,407,914, granted February 28, 1922, upon the application of Edward H. Belden, of Toledo, Ohio, for an improvement in "Vehicle Spring Suspensions," errors appear in the printed specification requiring correction as follows: Page 4, line 120, claim 22, after the word "axle" insert the words *adjacent each end thereof;* page 5, line 54, claim 29, for the word "of" read *to;* and that the said Letters Patent should be read with these corrections therein that the same may conform to the record of the case in the Patent Office.

Signed and sealed this 24th day of April, A. D., 1922.

[SEAL.]
            KARL FENNING,
             *Acting Commissioner of Patents.*